US005329102A

United States Patent [19]

Sansone

[11] Patent Number: 5,329,102

[45] Date of Patent: Jul. 12, 1994

[54] METHOD AND APPARATUS FOR PREPARING VALIDATED MAIL TRAY LABELS

[75] Inventor: Ronald P. Sansone, Weston, Conn.

[73] Assignee: Pitney Bowes Inc., Stamford, Conn.

[21] Appl. No.: 594,515

[22] Filed: Oct. 9, 1990

[51] Int. Cl.[5] .......... G06F 15/20

[52] U.S. Cl. .......... 235/375; 235/378; 235/384; 209/584; 209/546

[58] Field of Search .......... 235/375, 376, 495, 462, 235/384, 378; 364/464.01, 464.02, 464.03, 478; 209/584, 900, 3.3, 546

[56] References Cited

U.S. PATENT DOCUMENTS

| | | | |
|---|---|---|---|
| 4,117,975 | 10/1978 | Gunn | 235/375 |
| 4,482,059 | 11/1984 | Horri et al. | 209/584 |
| 4,576,287 | 3/1986 | Bingham et al. | 209/400 |
| 4,725,718 | 2/1988 | Sansone et al. | 235/375 |
| 4,760,534 | 7/1988 | Fougere | 235/375 |
| 4,776,467 | 10/1988 | Hayasaki | 209/900 |
| 4,796,193 | 1/1989 | Pitchenik | 235/375 |
| 4,797,832 | 1/1989 | Axelrod et al. | 235/375 |
| 4,800,505 | 1/1989 | Axelrod et al. | 209/584 |
| 4,849,884 | 7/1989 | Axelrod et al. | 364/464.02 |
| 4,852,013 | 7/1989 | Durst et al. | 364/464.02 |
| 4,856,602 | 8/1989 | Cordery et al. | 177/210 FP |
| 4,868,757 | 9/1989 | Gil | 364/464.02 |
| 4,979,605 | 12/1990 | Svyatsky | 198/349 |
| 4,980,542 | 12/1990 | Jackson et al. | 235/375 |

FOREIGN PATENT DOCUMENTS 0095737 12/1983 European Pat. Off. .

*Primary Examiner*—Eugene R. LaRoche
*Assistant Examiner*—Tan Nguyen
*Attorney, Agent, or Firm*—Peter Vrahotes; Melvin J. Scolnick

[57] ABSTRACT

A method and system for providing validated labels that are attached to mail trays immediately upon mail being processed by a mailer and placed in a tray. Mail lists and programs for sanitizing the mail list and sorting the mail to achieve postal discounts are stored in a mailer's processor. A printer is controlled to print addresses on documents, such as letters, that are forwarded to an inserter. A mail list stored in the processor indicates where the mail is to be sent, the class of mail, level of sortation and the contents of the mail. Tray contents are computed and appropriate labels are prepared by a label printer under its control. By making the tray label printing an intricate part of the mail processing system, as opposed to being an adjunct to it, the providing of the labels becomes more efficient, reliable and economical.

16 Claims, 1 Drawing Sheet

METHOD AND APPARATUS FOR PREPARING VALIDATED MAIL TRAY LABELS

BACKGROUND OF THE INVENTION

In the processing of enveloped mail that is being prepared for delivery to a Post Office, mail pieces are assembled from inserts that are placed into envelopes to form mail pieces. In contemporary mail processing, a mailer has a mail list program that is maintained on a processor, such as a main frame, and various components of a mail processing system will respond in accordance with the mail list program. There are a number of commercially available mail lists from software companies that will update and standardize such mail lists. These mail lists contain the names and addresses of recipients of a particular run of mail. An example of such a mail list program is FINALIST ® which checks the mainframe mailing list and improves it by standardizing the format. It also verifies and corrects address elements, appends carrier route, five-digit zip and Zip+4 codes. The FINALIST ® program also identifies addresses with insufficient delivery information and reports the deficiency by category. Another program that is available for mail processing is MAILERS CHOICE ® with which mail can be sorted for maximum postal discounts to the mailer and with which a final file can be produced. All but one of the discounts from the postal service requires correct traying to receive the discount. Both FINALIST ® and MAILERS CHOICE ® are trademarks of LPC Corporation.

Normally, a printer prints documents, such as a series of letters, under control of a mail list program and conveys those documents to an inserter sequentially. The inserter will then add selected inserts for each document in accordance with the program and these inserts, along with the document, will be inserted into an envelope to form the final mail piece. Usually, the envelope will be a windowed envelope whereby the address printed on the document will be visible through the window.

The mail pieces can either be weighed or their weights computed from their contents. Subsequently, other operations will take place such as determining the amount of postage, accounting for the postage, reading the zip code on the address of the mail pieces and printing a postal bar code on the envelope in response to such reading. The mail pieces are then placed in a tray in accordance to postal requirements to be sent to the post office. The tray must have a label attached thereto that identifies the mailer and the contents of the tray with regard to the class of mail, level of sortation, location of the post office and the ultimate destination of the mail including the zip code. Some of this information can be in bar code format.

In order for the mail tray to be labeled, a clerk must physically prepare a label or the clerk will be supplied with pre-printed or partially pre-printed labels by the postal service. In either case, there are certain disadvantages. If the clerk manually prepares the label as required, this is time consuming, could be illegible and not in a form supporting postal automation goals. On the other hand, if preprinted labels are supplied to the mail clerk, then a vast inventory of labels must be kept on hand and the clerk must select the appropriate label to be attached to the mail tray thus introducing probabilities of errors. Obviously, both of these schemes are time consuming and expensive. It would be advantageous to have a scheme whereby labels can be prepared in an automatic fashion to match the mail pieces in a tray. The labelled trays would enter the post office and provide more reliable and greater information than presently available from pre-printed labels, thus assuring rapid, accurate movement of the tray through the postal distribution network. It should be kept in mind that if the tray is mislabelled, its entire contents, in the neighborhood of 450 mail pieces, could be misdirected causing de-sortation of the contents at the misdirected final location because the postal service sorter program would not be programmed to find the individual pieces.

SUMMARY OF THE INVENTION

A method and system have been devised whereby validated labels for mail trays can be automatically provided for trays immediately upon mail being processed by a mailer and placed in a tray. A mail room system controller has stored therein a mail list and programs for sanitizing the mail list and sorting the mail to achieve postal discounts. A main frame computer, or the system controller, controls a printer that prints addresses on documents, such as letters, that are forwarded to the inserter. Because the address list stored in the controller indicates where the mail is to be sent, the class of mail, level of sortation and the contents of the mail, the controller has the information whereby tray contents can be computed and identifying labels can be prepared by a label printer under its control. More specifically, by making the tray label printing an intricate part of the mail processing system, as opposed to being an adjunct to it, the providing of the labels becomes more efficient, reliable and economical.

DETAILED INVENTION OF THE PREFERRED EMBODIMENTS

Figure 1:
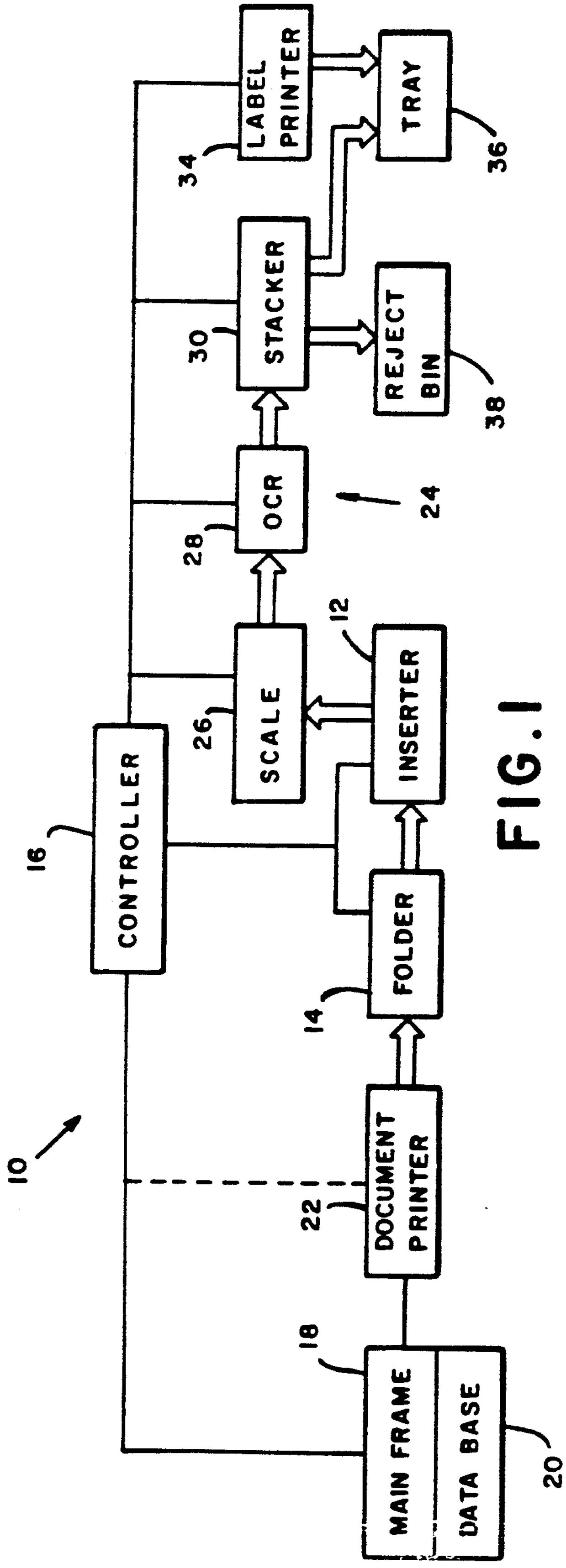
FIG. 1 is a block diagram showing a system for carrying lout the invention.

Referring now to FIG. 1, a mail processing system is shown generally at 10 and includes an inserter 12 which may be one of a number of commercially available inserters such as a model 8300 series inserter available from Pitney Bowes Inc., and a folder 14 that folds sheets and forwards them to the inserter. Although the folder 14 is shown as a separate device, it will be appreciated that it could be a unit of the inserter 12 as found in some commercial inserters. The inserter 12 and folder 14 are in communication with a system controller 16 which receives folding information from the folder and exchanges information with the inserter 12 and other units of the mail processing system 10 as will be described hereinafter. The controller 16 may be one of a number of commercially available computers such as an IBM model 80 PS/2 and would have stored therein selected portions of the Domestic Mail Manual (DMM). The controller 16 is in communication with a processor 18, such as a main frame computer, that will have a data base 20 which will store a multiplicity of mail address lists and accounts which will be organized geographically, by types of accounts, action dates, or in any other convenient manner, and mailing information including materials in the form of inserts to be sent to mail recipients including the weights and thicknesses of the inserts and documents. The processor 18 will store programs such as FINALIST® and MAILERS CHOICE®, which have been previously described, whereby the processor can control the processing of mail and will include postal sort schemes, address standardization routines and a program for organizing the various other programs to program the mail preparation routines. The processor 18 is in communication and will download selected mail list and address information to the controller 16 and to a document printer 22. By mail list is meant the names and address of recipients and materials to be received and by mailing information is meant zip code data, class of mail, postal distribution center where mail is to be sent, level of pre-sort and the like. The printer 22 will print a letter, or first page of inserts, for subsequent folding by the folder 14 and insertion by the inserter 12 into a windowed envelope. By first page is meant that page which will be adjacent to the window of the envelope so that it can be seen. The first page will have the name and address of the addressee printed thereon so as to be visible after being inserted into an envelope. Although as shown the document printer 22 is in communication with the processor 18, the document printer can be in communication with and controlled by the controller 16 as shown by the dotted lines thereby requiring the use of only one computer.

Downstream from the inserter 12 is a scale 26, an optical character recognition OCR device 28 and a stacker 30, all of which are in electrical communication with the controller 16. A label printer 34 is also in communication with the controller 16 for the purpose of printing labels 50 that can either be attached to trays, for first class mail, or to sacks, for third class mail. The preferred embodiment is described in connection with first class mail. The mail pieces at the stacker 30 will be placed into trays 36 if validated by controller 16. If there is a malfunction anywhere during the processing, the mail pieces will be outstacked to a reject bin 38 under control of the controller 16. Based upon the mail run and the functioning of the inserter 12, the label printer 34 will print the appropriate label for the processed mail pieces that are received within a tray 36. This label 50 then can be applied to the tray as required.

Although not shown, it will be appreciated that mechanisms known in the trade are provided for transporting printed documents from the document printer 12 to the folder 14 and thence to the inserter and transporting mail pieces from the inserter 12 to the scale 26, OCR device 28, and thence to the tray 36 or reject bin 38. In FIG. 1 the communication connections are shown by a single line and the movement of articles is shown by double lines.

Figure 2:
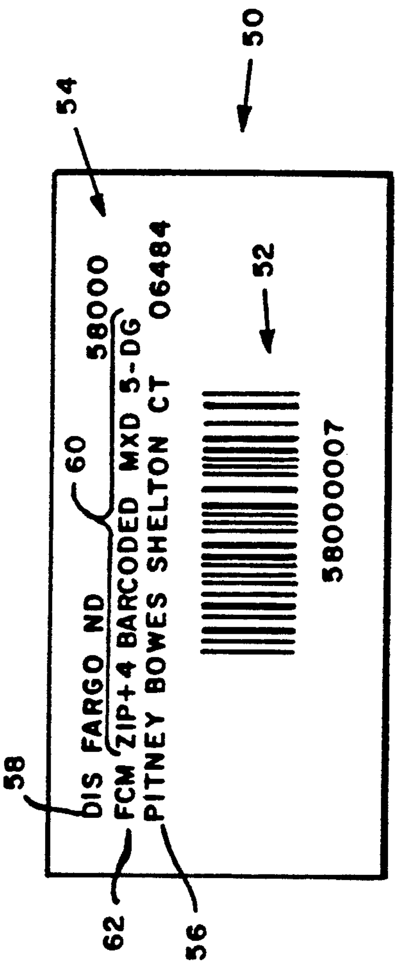
FIG. 2 is a plan view of a label that is prepared in accordance with the instant invention.

With reference to FIG. 2, a label 50 is shown that contains a bar code 52 and alpha-numerics 54. The purpose of the bar code and alpha-numerics is to provide information such as the origin of the mail 56, destination of the contents of the tray 58, the level of sortation 60 and class of mail 62 all of which is referred to as the classification of the mail. Although described relative to the alphanumerics, it will be appreciated that at least a portion of the information will be contained also in the bar code 52.

In operation, the data base 20 of the processor 18 stores the addresses and accounts so that a mail run can be carried out in accordance with its program as described. An operator would select the mail run to be processed and the processor 18 would control the printer 22 to print documents each with the name and address of the recipient, as well as any text required. A machine readable code, such as a dash code, also can be printed on the document to be read by the inserter 12. This code would determine the inserts to accompany a particular document as is well known in the art. For example, if the controller 16 is to process mail that is for the purpose of sending insurance statements due on a particular date to individuals having life insurance with a given insurance company, the main frame will extract the information from the data base 20 and optionally will forward the list of such insured persons to the controller 16. This list would include names, addresses, type of insurance, date payments are due, amount of payment and number of additional materials to be added by the inserter 12. The operator will insert the customer list to be run, as stated previously, either through the keyboard of the main frame 18 or by tape, which would include the inserts to be inserted by the inserter 12. The controller 16 will receive information from the folder 14 as to the number of times the document received from the document printer 22 is folded. The operator will enter through the keyboard of the controller 16, the type of document or letter to be printed and will have stored data relative to the type of document whereby the controller will know the weight of the document. Based upon the number of folds, type of document and number and types of inserts for a mail piece, the controller 16 will determine the weight and thickness of each mail piece that will be processed as well as the total number of mail pieces processed by the inserter 12. The zip code of each mail piece will be known because of the receipt of appropriate mailing information from the main frame 18. The controller 16 has the necessary domestic mail manual (DMM) regulations stored therein and will determine if the mail pieces being processed meet the latest DMM requirements based upon data received from the folder, inserter 12, scale 26, and OCR reader 28 and will control the number of mail pieces placed in a tray 36 based upon zip code information stored. The controller 16 will receive the measured weights of the mail pieces from the scale and compare this with the stored weights to determine if there is coincidence i.e. agreement between the measured and estimated weights. If different, those mail pieces will be outsorted by being placed in the reject bin 38 and the system would be checked to determine the reasons for the discrepancy. The controller 16 will also receive the read address information from the OCR device 28 and compare such read information with the stored mailing information. If there is coincidence, the particular mail piece will be processed by being placed in a tray 36, but if not, the mail piece will be outsorted into the reject bin 38. Using this read address information from the OCR device 28, the controller 16 also will determine if the DMM requirements for postal discounts are met, i.e., it will determine if a sufficient number of mail pieces are sent to a destination to qualify for a postal discount. If not, the controller 16 will determine the difference in postage for which there would be a subsequent accounting or it will cause the mail pieces to be placed into the reject tray 42 depending upon the wishes of the mailing.

With regard to the number of mail pieces to be placed in a tray 36, this will either be determined by the number that can fit into a tray, taking into account the thickness and number of inserts, or the addresses of the mail pieces. For example, all the mail pieces in a tray will go to a single distribution center and a tray will be only partially filled if there is only a limited amount of mail for such distribution center. On the other hand, if a large number of mail pieces are to be sent to a given distribution center, the thickness of the mail pieces will determine the number of mail pieces in a tray 36 and more than one tray would have mail for a given distribution center.

After a mail piece is processed by the inserter 12, it will be conveyed to a scale 26, such as the one shown and described in U.S. Pat. No. 4,856,602, where the mail piece will be weighed. Each mail piece will be weighed individually and the weight will be uploaded to the controller 16 which will make a determination whether the weights measured are the same as the estimated weight. If not, this indicates the inserter 12 is not working properly or input data was incorrect. After being weighed, the mail piece will be forwarded to the OCR device which will read the zip code. The OCR device 28 will send this information to the controller 16 to assure that the mail pieces have the correct address by comparing the read address with the stored address in the controller. The controller 16 will then enable the label printer 34 to print an appropriate tray label 50 to be placed on the tray 36 if the mail meets postal regulations and the weights and addresses are correct. It will be recalled that appropriate portions of the DMM are stored in the controller 16 which will determine if the thicknesses and weights are within the regulations and will determine the amount of postal discount available. Although the operation has been described with trays, it will be appreciated the sack labels could be printed as well.

After the run has been completed and all trays have been supplied with their respective labels, the controller 16 prints a 3602 pc, as through control of the printer 22, using data gathered during the mail run, thus validating the information on the labels as being correct.

As the post office receives the validated labelled trays from the mailer, no sorting or other processing is required by the post office and the mailing clerk can forward the trays directly to the appropriate distribution centers. This saves time and effort on the part of the post office for which the mailer is given a postal discount.

Although the operation has been described for the fully automated production of accurate tray labels, it will be appreciated that for the case of presorted, identical mail of fixed thickness, the system could operate in a "stand alone" mode. The only requirement would be that the operator would have to enter the first and last zip code and class/classification of the mail for each tray into the controller 16. The zip codes for the first and last mail piece in the tray may not have the same zip code, but the mail pieces would still go to the same distribution center. If the zip codes on the mail pieces are not those for the same distribution center, the controller 16 would question the validity of the tray contents. If correct, the controller would cause the label printer 34 to print the appropriate label.

Thus what has been shown and described is an apparatus and method for applying labels to trays and sacks in an automatic and validated manner.

I claim:

1. A system for providing labels for a mail tray to give destination and content information relative to mail pieces places in the mail tray, the combination comprising:

- a controller having a mail list, mailing information, and postal regulation information stored in the memory thereof,
- an inserting machine in communication with said controller for placing inserts into envelopes to form mail pieces under control of said control,
- a first printer for printing documents,
- a second printer in communication with said controller for printing labels based upon said mail list and mailing information,
- a scale in communication with said controller and downstream from said inserter for weighing mail pieces prepared by said inserter and for communicating the weight to said controller whereby said controller determines the amount of postage required, compares the measured weight with weight calculated by mailing and insert information received from said inserter.

2. The system of claim 1 wherein said inserter includes a document folder in communication with said controller for folding documents printed by said first printer, communicating the number of folds to said controller and supplying folded documents to said inserter.

3. The system of claim 1 wherein said first printer includes means for printing codes on documents to be read by the inserter for determining inserts that are to accompany the document in a mail piece.

4. The system of claim 3 including an OCR device located downstream from said scale and in communication with said controller for reading information on the mail pieces and a stacker located downstream from said OCR device and in communication with said controller for placing mail pieces validated by said controller in trays and outsorting mail pieces that are not validated by said controller.

5. A system for providing labels for a mail tray to give destination and content information relative to mail pieces placed in the mail tray, the combination comprising:

- a processor having mail list distribution data and mailing information stored therein,
- a controller having postal regulation information stored in the memory thereof,
- an inserting machine in communication with said controller for placing inserts into envelopes to form mail pieces and communicating mailing information to said controller,
- a first printer in communication with said processor for printing and delivering documents having machine readable information therein to said inserter, and
- a second printer in communication with said controller for printing labels,
- a scale in communication with said controller and downstream from said inserter for weighing mail pieces prepared by said inserter and for communicating the weight to said controller whereby said controller determines the amount of postage required, compares the measured weight with weight calculated based upon insert information and outsorts the mail pieces whose estimated and determined weights do no coincide.

6. The system of claim 5 wherein said inserter includes a document folder in communication with said controller for folding documents printed by said document printer, communicating the number of folds to said controller and supplying folded documents to said inserter.

7. The system of claim 5 including an OCR device located downstream from said inserter and in communication with said controller for reading data on the mail pieces whereby said controller will compare the stored mail information of the mail pieces with the data read by said OCR device to determine coincidence of the stored and read data.

8. The system of claim 7 including a stacker located downstream from said OCR device and in communication with said controller for placing mail pieces validated by said controller in trays and outsorting mail pieces that are not validated by said controller.

9. A system for providing labels for a mail tray to give destination and content information relative to mail pieces placed in the mail tray, the combination comprising:

a processor having mail list distribution data and mailing information stored therein, a controller in communication with the processor for receiving mailing information therefrom and having postal regulation information stored in the memory thereof, an inserting machine in communication with said controller for placing inserts into envelopes to form mail pieces, a first printer in communication with said processor for printing and delivering documents to said inserter, and a second printer in communication with said controller for printing labels, a scale in communication with said controller and downstream from said inserter for weighing mail pieces prepared by said inserter and for communicating the weight to said controller whereby said controller determines the amount of postage required, compares the measured weight with weight calculated by the inserter based upon insert information and outsorts the mail pieces whose estimated and determined weights.

10. The system of claim 9 wherein said inserter includes a document folder in communication with said controller for folding documents printed by said document printer, communicating the number of folds to said controller and supplying folded documents to said inserter.

11. The system of claim 10 including an OCR device located downstream from said inserter and in communication with said controller for reading data on the mail piece whereby said controller will compare the stored mail information of the mail pieces with the data read by said OCR device to determine coincidence of the stored and read data.

12. The system of claim 11 including a stacker located downstream from said OCR device and in communication with said controller for placing mail pieces validated by said controller in trays and outsorting mail pieces that are not validated by said controller.

13. A method of producing labels for a mail tray to provide mailing information relative to the mail pieces in the mail tray and the destination thereof, the steps comprising:

storing a mail list containing names and addresses of individuals, mailing information and postal regulations in a processor, storing Domestic Mail Manual regulations information in the processor, connecting the processor with an inserter to download selected address and mailing information to the inserter, printing documents with names and addresses from the stored mail list, individually combining the documents with inserts in accordance with mailing information received by the inserter from the processor, placing the combined inserts and documents into envelopes to form mail pieces, calculating the thickness of the mail pieces and determining how many mail pieces should be placed into a tray based upon the thicknesses of the mail pieces and zip codes and classifications thereof, calculating the weight of mail pieces placed into trays in accordance with the contents thereof, placing the determined number of mail pieces into a tray, weighing the mail pieces, communicating the weight of the mail pieces to the processor and determining the amount of postage due for the mail pieces, and outsorting mail pieces that do not meet Domestic Mail manual regulations, printing a label to identify the class, classification and destination of the tray, and applying the label to the tray.

14. The method of claim 13 including reading the address on the mail pieces and verifying the correctness of the addresses based upon the mail list stored in the computer.

15. A method of producing labels for a mail tray to provide mailing information relative to the mail pieces in the mail tray and the destination thereof, the steps comprising:

providing a mail list containing names and addresses of individuals and mailing information, in a processor, and storing Domestic Mail Manual regulations information in the processor, connecting the processor with an inserter to download selected address and mailing information to the inserter, printing documents with names and addresses from the mail list and a code based upon the provided mailing information, individually combining the documents with inserts in accordance with mailing information received from the code, calculating the weight of mail pieces placed into trays in accordance with the contents thereof, placing the combined inserts and documents into envelopes to form mail pieces, weighing the mail pieces and determining the amount of postage due for the mail pieces, and outsorting mail pieces that do not meet Domestic Mail Manual regulations, calculating the thickness of the mail pieces and determining how many mail pieces should be placed into a tray based upon the thicknesses of the mail pieces and zip codes and classification thereof, placing the determined number of mail pieces into a tray, printing a label to identify the class, classification and destination of the tray, and applying the label to the tray.

16. The method of claim 15 including reading the address on the mail pieces and verifying the correctness of the addresses based upon the mail list.

* * * * *